United States Patent [19]

Martin et al.

[11] Patent Number: 5,011,610

[45] Date of Patent: Apr. 30, 1991

[54] WATER TREATMENT METHOD

[75] Inventors: Frank S. Martin, Farmersville; Gary L. Silver, Centerville, both of Ohio

[73] Assignee: The United States of America as represented by the United States Department of Energy, Washington, D.C.

[21] Appl. No.: 473,794

[22] Filed: Feb. 2, 1990

[51] Int. Cl.$^5$ .............................................. C02F 1/28
[52] U.S. Cl. .................... 210/667; 210/688; 210/719; 210/721; 210/912
[58] Field of Search ............. 210/667, 688, 702, 717, 210/719, 721, 723, 724, 726, 738, 912–914

[56] References Cited

U.S. PATENT DOCUMENTS

| | | | |
|---|---|---|---|
| 2,041,584 | 5/1936 | Adler | 210/702 |
| 4,329,224 | 5/1982 | Kim | 210/709 |
| 4,537,686 | 8/1985 | Borbely et al. | 210/904 |
| 4,615,873 | 10/1986 | Devuyst et al. | 210/721 |

OTHER PUBLICATIONS

E. Devuyst et al., "An Oxidant of Unexpected Utility", *Chemtech*, pp. 426–427, Jul. 1979.
G. Silver's Letter in Chemtech, Sep. 1986, pp. 517.
G. Silver, "Continuous Removal of Radioactive Cobalt From Water", *Journal of Radioalytical Nuclear Chemistry*, Letters 119/2, pp. 77–80, Jun. 20, 1987.

*Primary Examiner*—Peter Hruskoci
*Attorney, Agent, or Firm*—Armand McMillan; James H. Chafin; William R. Moser

[57] ABSTRACT

A method for reducing the concentration of any undesirable metals dissolved in contaminated water, such as waste water. The method involves uniformly reacting the contaminated water with an excess amount of solid particulate calcium sulfite to insolubilize the undesirable metal ions, followed by removal thereof and of the unreacted calcium sulfite.

3 Claims, No Drawings

WATER TREATMENT METHOD

This invention relates to the treatment of contaminated waste water, such as industrial waste water, for the extraction of toxic metal compounds dissolved therein. The U.S. Government has rights in this invention pursuant to Contract No. DE-AC04-76DP00053 between the U.S. Department of Energy and Monsanto Research Corporation (now EG & G Mound Applied Technologies).

BACKGROUND OF THE INVENTION

Many industrial processes generate substantial quantities of waste water, much of which is contaminated with toxic metal ions and therefore cannot be discharged into the environment without endangering the public health. There are many waste water treatment processes in use today, including ion exchange processes, hydroxide precipitation processes, and sulfide precipitation processes, to name just three. All of these processes have advantages that may recommend them for particular applications, and disadvantages that preclude their use for other applications. Ion exchange methods are useful where decontamination and recovery of precious metals is desirable. However, ion exchange resins are expensive, and ion exchange methods cannot ordinarily be used effectively for solutions containing high concentrations of ancillary salts. Hydroxide precipitation is inexpensive and effective to precipitate metals having insoluble hydroxides which are not redissolved in excess alkali. However, alkali hydroxides are poisonous and corrosive, and the excess hydroxide must be neutralized with acid before the treated waste water can be returned to the environment. Sulfide precipitation can be used effectively to precipitate contaminating metals which form insoluble sulfides. However, soluble sulfides form toxic liquids which can release one of the most toxic and unpleasant gases on exposure to acids, i.e., hydrogen sulfide, which can be released from some inorganic sulfides on exposure to moist air containing carbon dioxide.

U.S. Pat. No. 4,329,224 (Kim) discloses a precipitation method for decontaminating water based upon treatment of the water with an aqueous calcium sulfide composition. Water to be decontaminated is treated with dissolved calcium sulfide, i.e., with a solution of dissolved calcium hydroxide through which hydrogen sulfide gas has been passed. Treating dissolved calcium hydroxide, $Ca(OH)_2$, with hydrogen sulfide gas yields dissolved calcium bisulfide $Ca(HS)_2$. The bisulfide ions act as the source of sulfide ions which precipitate the sulfides of undesirable metals.

It will be recognized by those skilled in the art that the Kim process is inherently dangerous and unpleasant. Hydrogen sulfide is an evil-smelling gas with the odor of rotten eggs, and is detectable at very low concentrations. High concentrations of hydrogen sulfide are extremely hazardous, and a few hundred parts per million can produce death in a short time. At high concentrations the gas is also combustible. Dissolved sulfide solutions are dangerous since they are inherently toxic and since they release hydrogen sulfide gas upon exposure to acids. Carbon dioxide and moisture can react in the air to form carbonic acid, which acid can release hydrogen sulfide from many aqueous soluble sulfide solutions exposed to air. Thus, any process using compressed hydrogen sulfide, or soluble sulfides, is inherently dangerous.

Kim describes his calcium sulfide water treatment as a two-stage process in which "nontoxic" metals are removed by hydroxide precipitation in the first stage and "toxic" metals are removed by sulfide precipitation in the second stage. However, the fact is that some toxic metals, such as thorium, can be removed by hydroxide precipitation in the first stage, while other toxic metals, such as barium, are not removed by sulfide precipitation in the second stage. The Kim process is based upon an inaccurate principle since nature has not classified nontoxic or toxic metals as those that can or cannot be precipitated by alkali, respectively.

It is clear to those skilled in the art that a more economical and safer waste water treatment method is required, which does not require the use of expensive, unstable, combustible, or toxic materials. Calcium sulfide is stable only in the dry form and is in relatively short supply. These problems of supply, stability, and toxicity are critical considering the immense amounts of this chemical required for large-scale water treatment processes.

SUMMARY OF THE INVENTION

The present invention relates to a new method for treating water, such as waste water, to remove certain undesirable polluting metals therefrom prior to the release of water into the environment. The novel method of the present invention is free of the disadvantages, dangers and other limitations of prior-known methods, and employs treatment material which is safe or harmless, inexpensive, and readily available in large quantities.

The present method involves treating contaminated water with an aqueous suspension of finely divided calcium sulfite to react the calcium sulfite with the ions of polluting metals dissolved in the waste water, resulting in insolubilization and removal of the polluting metals out of solution.

Calcium sulfite is a chemical which is currently being produced in large quantities in air purification systems in which stack gases are scrubbed to remove sulfur dioxide. Such scrubbing is commonly performed at electric power plants which burn coal. More calcium sulfite is being produced today than can be marketed, so this material is available in large amounts and is inexpensive. Fortunately, calcium sulfite is nontoxic and practically insoluble, so it can be discarded by dumping into commercial landfills without leaching problems. However, it is preferable to put this material to practical use.

Calcium sulfite slowly oxidizes in air to form calcium sulfate, commonly called gypsum or "plaster of paris". This material is used in home building materials and for children's modelling kits. Moreover, soluble sulfites are used as food preservatives, a use that the toxic, soluble sulfides do not have. Calcium sulfite is reactive with acid to form sulfur dioxide gas which is irritating to the eyes and respiratory tract, but its toxicity cannot be compared to the toxicity of hydrogen sulfide. In contrast to the foul-smelling hydrogen sulfide, sulfur dioxide has a mild odor. Thousands of tons of sulfur dioxide are discharged to the atmosphere yearly, an undesirable circumstance to be sure, but a circumstance that would be inconceivable for hydrogen sulfide. It will thus be apparent that any waste water treatment process based on the use of calcium sulfite is inherently less dangerous and more economical than a process based on the use of soluble sulfides.

We have discovered that finely powdered calcium sulfite, the common form of calcium sulfite, reacts with many dissolved metal ions, leading to insolubilization of the metal, and that the insolubilized metal can be removed from waste water by any one of a number of simple procedures to produce pollutant-reduced waste water suitable for discharge into the environment.

DETAILED DESCRIPTION

It has been recognized for many years that solids adsorb metal ions, or metal ion compounds, on their surfaces. The process of adsorption is not limited to dissolved metals. In this capacity, calcium sulfite acts as an inert, high-surface-area adsorbent. Its advantage for this purpose is that it is inexpensive and nonhazardous. The more soluble and more toxic calcium sulfide is not as appropriate for this purpose.

In the presence of molecular oxygen, as in air or oxygen gas, calcium sulfite is a powerful oxidizing agent. The chemical basis for the oxidizing action is not understood, but it is thought to be related to the probable presence of the anion $SO_5{}^{2-}$, the anion of Caro's acid. Thus, cobalt and nickel can be insolubilized and removed from aqueous solution by passing air through waste water solutions if they also contain suspensions of calcium sulfite. Recovery of cobalt and nickel is desirable because of the value of these metals. Even if the solution is only stirred in the presence of air, some removal of cobalt and nickel is still possible, as illustrated by Table I below. Other metals, such as manganese and thallium, also can be removed from oxygenated solutions containing suspensions of calcium sulfite. Moreover, such aerated oxidizing solutions are also effective for destroying bacteria present in the waste water, as indicated by the article by co-inventor Gary Silver on page 517 of the technical magazine CHEMTECH, September 1986.

The use of calcium sulfite in oxygenated solutions is well known in procedures which are not related to the public health aspects of clean water. Such known procedures are illustrated, for example, by the article titled "An oxidant of unexpected utility" by Devuyst et al. published in the technical magazine CHEMTECH, July 1979, pages 426 and 427. According to such procedures, water containing a suspension of $Ni(OH)_2$ can be treated with a slurry of calcium sulfite to oxidize the $Ni(OH)_2$ and precipitate $Ni(OH)_3$ for recovery of the latter in high yield.

Calcium sulfite used in the absence of air can remove metal ions from solution by another mechanism since soluble sulfites are also known to be reducing agents. Thus, if no molecular oxygen is present to renew the concentration of $SO_5{}^{2-}$, the reducing property of calcium sulfite dominates. Therefore, any metal ion that can be reduced to the metallic state by sulfite ions is removable by reduction. Deoxygenation can be accomplished by adding calcium sulfite to water and sealing the container. Moreover, any metal that also forms an insoluble salt in its reduced state can be precipitated and removed by treatment with calcium sulfite and the precipitate-forming anion. We have found that copper ions, in the presence of chloride ions, can be removed from solution by calcium sulfite if air is excluded. The probable mechanism is reduction of the copper from the soluble divalent state to the insoluble univalent state, i.e., cuprous chloride.

Metal ion removal by reduction is also possible using calcium sulfide. Whenever a reduction reaction occurs, it must be accompanied by an oxidation reaction. In the case of calcium sulfite, the oxidation product is innocuous calcium sulfate whereas with calcium sulfide the oxidation product is elemental sulfur, which is objectionable.

Any metal that forms an insoluble sulfite can also be removed from solution by treatment of the solution with a suspension of calcium sulfite. A good example is barium, a metal widely recognized as toxic and objectionable. Barium sulfite, like calcium sulfite, is a material of low water-solublity. We have found that calcium sulfite effectively removes barium ions from solution. As the calcium sulfite gradually ages, moreover, it oxidizes, forming calcium sulfate. Thus the barium will ultimately be locked in the sludge as barium sulfate, a nontoxic material that is used to outline the stomach and intestines in medical diagnostic procedures. Barium is a toxic metal that cannot be removed by hydroxide- or sulfide-precipitation.

It is well known that many metal ions hydrolyze in aqueous solution. Hydrolysis is the reaction of the metal ion with water to form a hydroxyl complex. For example, the hydrolysis reaction of a trivalent ion can be represented as:

$$M^{3+} + HOH = MOH^{2+} + H^+ \qquad (1)$$

Further hydrolysis to such species as the dihydroxy complex is inhibited by the acid generated in the hydrolysis reaction. Nevertheless, some metal ions hydrolyze to such an extent that precipitation of the metal hydroxide occurs. Any substance introduced into the solution that removes the acid generated by hydrolysis will abet hydrolysis and encourage precipitation of the metal ion as the hydroxide. Calcium sulfite is one such material:

$$CaSO_3 + H^+ = Ca^{2+} + HSO_3{}^- \qquad (2a)$$

$$HSO_3{}^- + H^+ = HOH + SO_2 \qquad (2b)$$

Thus, hydrolysis of metal ions in the presence of calcium sulfite can lead to bisulfite ion generation in the presence of an excess amount of calcium sulfite, or to the generation of sulfur dioxide gas if the calcium sulfite is not present in an excess amount. This mechanism of metal ion removal applies to calcium sulfide as well as to calcium sulfite, but the former material is more costly, and much more hazardous, than the latter.

The efficacy of the present process is demonstrated by treating contaminated waste water solutions with excess amounts of calcium sulfite powder in an intimate uniform reaction dispersion under conditions which produce a reaction between a portion of the calcium sulfite and toxic metals dissolved in the waste water. This has been accomplished in laboratory vessels to simulate batchwise operation on a larger scale. Three grams of calcium sulfite was added to each of several 100-milliliter flasks. To each flask was then added contaminated water containing a soluble contaminating metal ion. The flasks were stoppered to eliminate air circulation and shaken at regular intervals over a period of about one week to ensure the uniform dispersion of the calcium sulfite particles throughout the contaminated water sample. At the end of the contact period, samples of the solutions were removed for analysis. The remaining portions of some of the solutions were then stirred in air to demonstrate the effect of atmospheric oxygen on the removal of additional pollutants. It will be appreciated that this method of contacting the contaminated water with finely divided calcium sulfite in the absence of air, and in the presence of air, and time of air exposure, is merely illustrative and is not to be taken as limiting.

The results of the experiments are shown in Table I. Table I illustrates that calcium sulfite, in the absence of air, is an effective agent for removing some metals from water. For some metals, such as barium, lead and silver, the extent of removal is substantial. For other metals, such as zinc, removal is only partial. For yet other metals, the removal of contaminating metal ions is not very effective. These metals must be removed by other pollution control methods if their presence is objectionable. Table I also demonstrates that some ions, not well removed in the absence of air, can be more effectively removed by exposure of the solutions to oxygen during reaction with the calcium sulfite particles. Exposure to air was accomplished by stirring the solutions containing the calcium sulfite and the pollutant overnight. This method of oxygen exposure is much less efficient than sparging with air or oxygen gas.

Mixtures of calcium sulfite particles and the treated water separate readily. Thus, even when the calcium sulfite is used as a fine powder, only about two hours is required for segregation by settling. Alternatively, calcium sulfite is useful in column operations, although a fine powder is less suited to such use than larger particles such as beads or prills of the calcium sulfite.

The step of removing the contaminating metals from the treated waste water merely involves allowing the insoluble calcium sulfite to settle out of the aqueous medium, which step may be hastened by centrifuging and accompanied by filtration. The sediment, i.e., the contaminated calcium sulfite, contains or includes precipitates of certain of the contaminating metals in the form of insoluble salts, insoluble contaminating metal ions which have been adsorbed by the calcium sulfite particles and bonded thereto in the sediment, insoluble particles of the contaminating metals in their reduced state, and oxidized calcium sulfite in the form of insoluble calcium sulfate.

TABLE I

REMOVAL OF METAL IONS FROM WATER BY CALCIUM SULFITE

| Metal | Initial Concentration (ppm) | Concentration after Treatment (ppm) | Percent Removal |
|---|---|---|---|
| (Stoppered Flask) | | | |
| Barium | 974 | <1 | 99.9 |
| Silver | 1013 | <1 | 99.9 |
| Lead | 758 | <1 | 99.9 |
| Palladium | 824 | 8.2 | 99.0 |
| Copper (chloride) | 988 | 9.9 | 99.0 |
| Strontium | 913 | 128 | 86.0 |
| Vanadium (III) | 653 | 191 | 70.8 |
| Copper (nitrate) | 987 | 573 | 42.0 |
| Zinc | 1009 | 587 | 41.8 |
| Iron (II) | 1034 | 777 | 24.9 |
| Manganese (II) | 1006 | 770 | 23.5 |
| Cobalt | 994 | 861 | 13.4 |
| Nickel | 1007 | 905 | 10.1 |
| Chromium (III) | 1004 | 929 | 7.5 |
| (Stirring in Air) | | | |
| Cobalt | 994 | 272 | 72.6 |
| Manganese | 1006 | 580 | 42.3 |
| Nickel | 1007 | 756 | 24.9 |

It can be seen from Table I that treatment of waste water with calcium sulfite provides a very simple and very effective method for removing substantial amounts of certain contaminating metals from solution. Thus, in the case of the metals near the top of Table I, no additional treatment may be necessary. Metals near the center of the table are less effectively removed, and waste water solutions contaminated with these metals may require further treatment, depending upon the degree of purity required. Thus, for certain applications, treatment with calcium sulfite is a safe, effective, and inexpensive form of pollution control.

It is essential to the present process that excess amounts of the calcium sulfite are used, over and above the amounts which take part in and are consumed in the various reaction processes. This is necessary because the unreacted calcium sulfite functions as an ion adsorption solid which adsorbs some of the toxic metal ions and draws them out of the waste water into the solid sediment. Moreover, the excess amounts of the calcium sulfite particles can be agitated to a uniform dispersion throughout the waste water, providing an intimate reaction mixture in which all portions of the waste water are contacted with the calcium sulfite particles, such as for adsorption purposes. These results cannot be obtained through the use of stoichiometric amounts of the calcium sulfite or calcium sulfite particles which are not dispersed through the waste water being treated.

It will be apparent to those skilled in the art that the present water purification process can be used in a continuous or intermittent purification system in which waste water is continuously or intermittently supplied to one or more metal-extraction stations prior to release into the environment or prior to passage through one or more other extraction stations for the removal of other metals or contaminants which are not adequately removed by the present process. The present extraction stations preferably include one from which air or oxygen is excluded, to produce a reduction reaction with a portion of the calcium sulfite, and another station which includes aeration means, such as oxygen sparging, to produce an oxidation reaction with a portion of the calcium sulfite, as discussed hereinbefore. Both stations preferably include a means for continuously or intermittently introducing and dispersing the calcium sulfite, and a means for removing the contaminated calcium sulfite sediment including the extracted toxic metals.

The present calcium sulfite treatment process can be used as part of a segregating process, removing and concentrating some pollutants in the sediment while leaving others largely unaffected in the waste water.

The pollutant metals removed from solution by the present process do not disappear. They remain in the sediment or solid phase until recycled or disposed of.

Disposal by burial is a suitable method for the contaminated calcium sulfite. Recovery of the metal contaminants is easier and less dangerous with the sulfite process than with the sulfide process. Both metal sulfides and metal sulfites can be dissolved in acid. In the case of the sulfites, provision must be made for venting sulfur dioxide gas, which is irritating, but otherwise benign or relatively harmless in moderate quantities. Thus, recovery of the pollutant is easier and safer with the present sulfite process than with the prior known sulfide process.

Variations of the novel water purification method of the present invention will be apparent to those skilled in the art in the light of the present disclosure. For example, the particulate calcium sulfite may be generated in situ, such as by the reaction of calcium hydroxide with sulfur dioxide gas in the waste water. Also, the present water purification method may be conducted in a batch-wise or continuous manner, such as by passing waste water through a column operation or a reaction and separation zone prior to continuous discharge of the treated waste water into a sewer or other disposal site.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. Method for treating contaminated waste water containing dissolved metals including barium, silver, lead palladium, copper, strontium, or vandium, for the partial or substantially complete extraction thereof, comprising (a) dispersing uniformly throughout said contaminated waste water in the absence of molecular oxygen finely divided calcium sulfite in excess amounts sufficient to provide unreacted calcium sulfite to function as an ion adsorption solid which adsorbs at least some of said metals, to yield an intimate reaction mixture thereof under conditions which cause a reduction and insolubilization of said metals by reaction of a portion of said calcium sulfite with said metals and (b) separating the unreacted portion of said calcium sulfite and the insolubilized metal reaction products from the waste water.

2. Method according to claim 1 in which said finely divided calcium sulfite is in powder form.

3. Method according to claim 1 which is conducted in a continuous manner, comprising introducing a continuous or intermittent supply of the contaminated waste water, introducing a continuous or intermittent supply of the finely divided calcium sulfite, and continuously or intermittently separating out the insolubilized metal reaction products.

* * * * *